United States Patent
Saitoh et al.

(10) Patent No.: US 9,242,482 B2
(45) Date of Patent: Jan. 26, 2016

(54) PH DETECTING DEVICE, PRINTING SYSTEM, AND METHOD FOR MANUFACTURING PRINTED MATERIAL

(71) Applicants: Haruki Saitoh, Kanagawa (JP); Koji Nagai, Kanagawa (JP); Hiroyuki Hiratsuka, Kanagawa (JP); Satoshi Katoh, Kanagawa (JP)

(72) Inventors: Haruki Saitoh, Kanagawa (JP); Koji Nagai, Kanagawa (JP); Hiroyuki Hiratsuka, Kanagawa (JP); Satoshi Katoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/642,587

(22) Filed: Mar. 9, 2015

(65) Prior Publication Data
US 2015/0258813 A1    Sep. 17, 2015

(30) Foreign Application Priority Data

Mar. 11, 2014  (JP) ................................ 2014-048216
Jan. 30, 2015  (JP) ................................ 2015-017865

(51) Int. Cl.
B41J 2/01    (2006.01)
B41J 29/393    (2006.01)
B41J 11/00    (2006.01)
B41J 2/21    (2006.01)

(52) U.S. Cl.
CPC . *B41J 11/009* (2013.01); *B41J 2/21* (2013.01)

(58) Field of Classification Search
USPC ............................................ 347/19, 101–102
See application file for complete search history.

(56) References Cited

U.S. PATENT DOCUMENTS

| | | | |
|---|---|---|---|
| 6,528,129 B1 | 3/2003 | Kondo | |
| 8,132,907 B2* | 3/2012 | Kariya | B41J 11/002 347/101 |
| 2007/0058019 A1 | 3/2007 | Saitoh et al. | |
| 2009/0290007 A1* | 11/2009 | Saitoh | C09D 11/322 347/102 |
| 2011/0064489 A1 | 3/2011 | Bisaiji et al. | |
| 2013/0250017 A1 | 9/2013 | Saitoh et al. | |
| 2014/0078212 A1 | 3/2014 | Nakai et al. | |
| 2014/0160197 A1 | 6/2014 | Hirose et al. | |
| 2015/0035918 A1 | 2/2015 | Matsumoto et al. | |

FOREIGN PATENT DOCUMENTS

| | | |
|---|---|---|
| JP | 2000-301711 | 10/2000 |
| JP | 2003-034069 | 2/2003 |
| JP | 2010-188568 | 9/2010 |
| JP | 4662590 | 1/2011 |
| JP | 2013-199017 | 10/2013 |

* cited by examiner

*Primary Examiner* — Jason Uhlenhake
(74) *Attorney, Agent, or Firm* — Duft Bornsen & Fettig LLP

(57) ABSTRACT

A pH detecting device includes a supplying unit to supply a pH indicator, with an inkjet head, to a surface of a material to be processed on which acidification is performed; a color information detector to detect color information of the pH indicator supplied to the surface of the material; and a pH specifying unit to specify a pH value of the surface of the material based on the color information.

14 Claims, 14 Drawing Sheets

SMALL ⟵⎯⎯⎯⎯⎯⎯⎯⎯⟶ LARGE
PLASMA ENERGY

PH DETECTING DEVICE, PRINTING SYSTEM, AND METHOD FOR MANUFACTURING PRINTED MATERIAL

CROSS-REFERENCE TO RELATED APPLICATIONS

The present application claims priority to and incorporates by reference the entire contents of Japanese Patent Application No. 2014-048216 filed in Japan on Mar. 11, 2014 and Japanese Patent Application No. 2015-017865 filed in Japan on Jan. 30, 2015.

BACKGROUND OF THE INVENTION

1. Field of the Invention

The present invention relates to a pH detecting device, a printing system, and a method for manufacturing a printed material.

2. Description of the Related Art

The conventional inkjet recording apparatuses employ a shuttle structure that causes a head to reciprocate in the width direction of a recording medium, such as paper and a film. This configuration makes it difficult to increase throughput in high-speed printing. To support high-speed printing, there has recently been developed a one-pass printing system that performs recording at a time with a plurality of heads aligned so as to cover the whole width of a recording medium.

The one-pass printing system is effectively used for high-speed printing; however, before a previously ejected ink permeates into the recording medium, adjacent dots are ejected at short time intervals. This mechanism is likely to cause unification of adjacent dots (hereinafter referred to as droplet interference), resulting in reduced image quality.

Therefore, there is a need to detect the state of the surface of a material to be processed to manufacture a high-quality printed material.

SUMMARY OF THE INVENTION

It is an object of the present invention to at least partially solve the problems in the conventional technology.

According to an embodiment, a pH detecting device that includes a supplying unit to supply a pH indicator, with an inkjet head, to a surface of a material to be processed on which acidification is performed; a color information detector to detect color information of the pH indicator supplied to the surface of the material; and a pH specifying unit to specify a pH value of the surface of the material based on the color information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
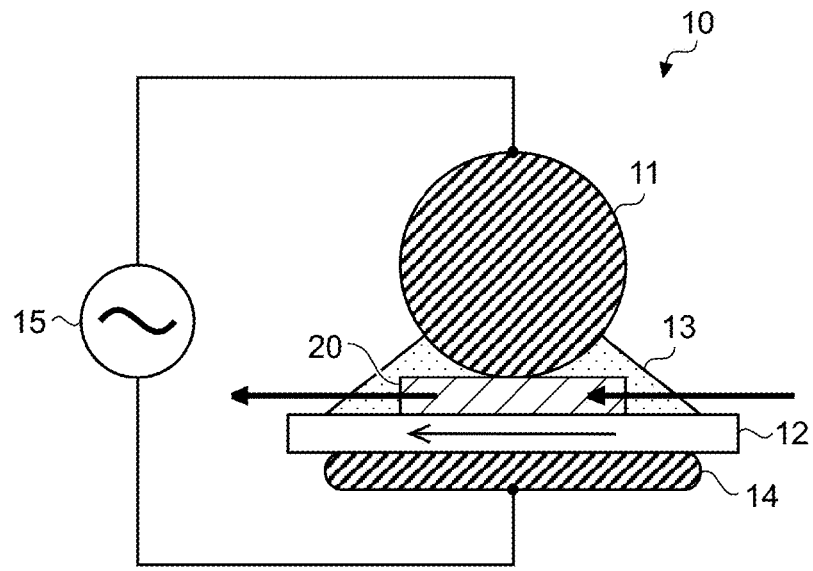
FIG. 1 is a schematic of an example of a plasma processing apparatus that performs plasma processing employed in a first embodiment.

Exemplary embodiments according to the present invention are described below in greater detail with reference to the accompanying drawings. Because the embodiments below are exemplary embodiments of the present invention, various technologically suitable limitations are provided to them. The description below, however, is not intended to improperly limit the scope of the present invention, and not all the components described in the embodiments are essential for the present invention.

First Embodiment

A printing apparatus, a printing system, a method for manufacturing a printed material, and a pH detecting device according to a first embodiment of the present invention will be described in greater detail with reference to the accompanying drawings. The first embodiment has characteristics below to reform the surface of a material to be processed and manufacture a high-quality printed material.

In the first embodiment, to prevent dispersion of ink pigments and aggregate the pigments immediately after an ink lands on a material to be processed (also referred to as a recording medium or a print medium), the surface of the material is acidified. While the first embodiment describes atmospheric plasma processing performed by dielectric barrier surface streamer discharge as a method of acidification, the method is not limited thereto.

In the embodiment below, the amount of plasma energy is controlled such that the acidity (pH value) of the surface of the material falls within a target range. This improves the circularity of an ink dot (hereinafter simply referred to as a dot) and prevents unification of dots, thereby increasing the sharpness and the color range of the dots. This mechanism can solve an image defect, such as beading and bleeding, thereby providing a printed material on which a high-quality image is formed. Furthermore, by making the aggregation thickness of the pigments on the print medium thin and even, the amount of ink droplet is reduced. This can reduce the energy for drying the ink and the printing cost.

To explain the first embodiment, an example of plasma processing employed in the first embodiment is described first in greater detail with reference to the accompanying drawings. In the plasma processing employed in the first embodiment, a material to be processed is irradiated with plasma in the atmosphere. Thus, polymers on the surface of the material react to form hydrophilic functional groups. Specifically, electrons e released from a discharge electrode are accelerated in the electric field to excite and ionize atoms and molecules in the atmosphere. The ionized atoms and molecules also release electrons, thereby increasing the number of high-energy electrons. As a result, streamer discharge (plasma) is generated. The high-energy electrons in the streamer discharge cut polymer bonds on the surface of the material (e.g., coat paper) (a coat layer of the coat paper is solidified with calcium carbonate and starch serving as a binder, and the starch has a polymer structure). The polymers then recombine with oxygen radicals O*, hydroxyl radials (—OH), and ozone $O_3$ in the vapor phase. The processing described above is referred to as plasma processing. The processing forms polar functional groups, such as hydroxyl group and carboxyl groups, on the surface of the material, thereby providing hydrophilicity and acidity to the surface of the material. An increase in the number of carboxyl groups causes acidification (reduction in the pH value) on the surface of the material.

The increased hydrophilicity on the surface of the material causes adjacent dots on the surface of the material to wetly spread and unify. To prevent color mixture between the dots attributed to the unification, it is necessary to quickly aggregate colorant (e.g., pigments or dye) in the dots. In addition, it is also necessary to dry a vehicle or cause the vehicle to permeate into the material before the vehicle wetly spreads. Because the plasma processing described above also functions as an acidifying unit (process) to acidify the surface of the material, the processing can increase the aggregation speed of the colorant in the dots. In terms of this respect, the plasma processing is effectively performed as preprocessing prior to inkjet recording.

In the first embodiment, atmospheric non-equilibrium plasma processing using dielectric barrier discharge may be employed as the plasma processing, for example. Because acidification with atmospheric non-equilibrium plasma has an extremely high electron temperature and a gas temperature at nearly normal temperature, it is one of preferable plasma processing methods for a material to be processed such as a recording medium.

To stably generate atmospheric non-equilibrium plasma in a wide range, there has been developed atmospheric non-equilibrium plasma processing employing dielectric barrier discharge with streamer breakdown. Dielectric barrier discharge with streamer breakdown can be generated by applying an alternating high voltage between electrodes covered with a dielectric, for example. Besides the dielectric barrier discharge with streamer breakdown described above, various methods may be used to generate atmospheric non-equilibrium plasma. Examples of the methods may include dielectric barrier discharge generated with an insulator, such as a dielectric, inserted between electrodes, corona discharge generated by forming a non-uniform electric field in a thin metal wire or the like, and pulse discharge generated by applying a short pulse voltage. Furthermore, two or more of these methods may be combined.

FIG. 1 is a schematic of an example of a plasma processing apparatus that performs plasma processing employed in the first embodiment. As illustrated in FIG. 1, the plasma processing employed in the first embodiment may be performed by a plasma processing apparatus 10 including a discharge electrode 11, a counter electrode (also referred to as an earth electrode) 14, a dielectric 12, and a high-frequency high-voltage power source 15. The dielectric 12 arranged between the discharge electrode 11 and the counter electrode 14 in the plasma processing apparatus 10 may be an insulator, such as polyimide, silicon, and ceramic. The high-frequency high-voltage power source 15 applies a high-frequency and high-voltage pulse voltage between the discharge electrode 11 and the counter electrode 14. The value of the pulse voltage is set to approximately 10 kV (p-p), for example. The frequency of the pulse voltage may be set to approximately 20 kHz, for example. By supplying such a high-frequency and high-voltage pulse voltage between the two electrodes, atmospheric non-equilibrium plasma 13 is generated between the discharge electrode 11 and the dielectric 12. A material 20 passes between the discharge electrode 11 and the dielectric 12 while the atmospheric non-equilibrium plasma 13 is being generated. Thus, the surface of the material 20 on the discharge electrode 11 side is subjected to plasma processing.

The plasma processing apparatus 10 illustrated in FIG. 1 employs a rotary discharge electrode 11 and a belt-conveyer-type dielectric 12. The material 20 is sandwiched and conveyed between the rotating discharge electrode 11 and the dielectric 12, thereby passing through the atmospheric non-equilibrium plasma 13. Thus, the surface of the material 20 comes into contact with the atmospheric non-equilibrium plasma 13, thereby being uniformly subjected to plasma processing. The plasma processing apparatus employed in the first embodiment does not necessarily have the configuration illustrated in FIG. 1. Various modifications may be made on the plasma processing apparatus, such as a configuration in which the discharge electrode 11 is not in contact with the material 20 but adjacent thereto and a configuration in which the discharge electrode 11 is mounted on the same carriage as that of an inkjet head.

Figure 2:
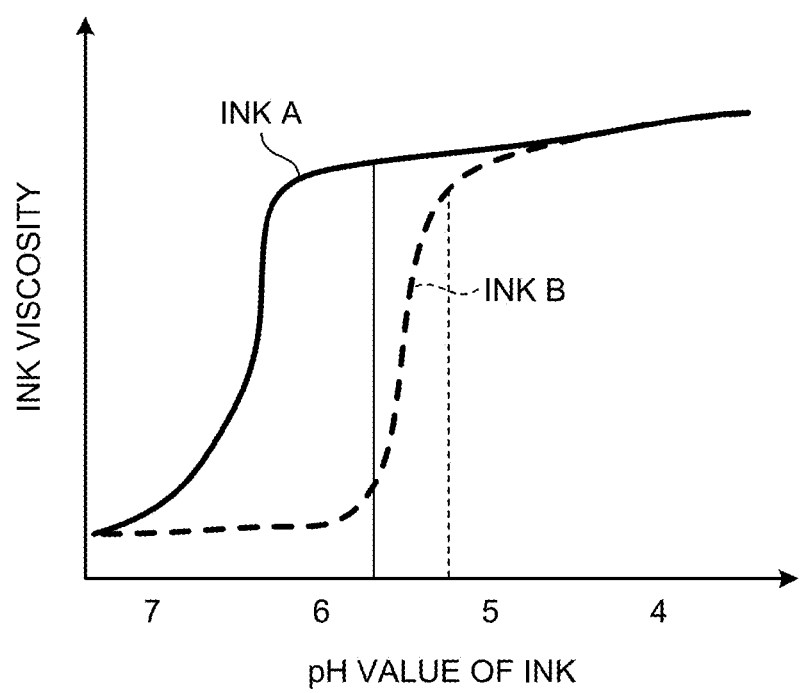
FIG. 2 is a diagram of an example of the relation between the pH value and the viscosity of an ink according to the first embodiment.

Acidification in this description means lowering the pH value of the surface of the print medium to a pH value at which the pigments included in the ink aggregate. To lower the pH value is to increase the concentration of hydrogen ions $H^+$ in an object. The pigments in the ink before coming into contact with the surface of the material are negatively charged and dispersed in the vehicle. FIG. 2 illustrates an example of the relation between the pH value and the viscosity of an ink. As illustrated in FIG. 2, the viscosity of an ink increases as the pH value thereof decreases. This is because the negatively charged pigments in the vehicle of the ink are electrically neutralized to aggregate as the acidity of the ink increases. By lowering the pH value of the surface of the print medium such that the pH value of the ink reaches a value corresponding to required viscosity in the graph illustrated in FIG. 2, for example, it is possible to increase the viscosity of the ink. This is because, when the ink adheres to the acidified surface of the print medium, the pigments are electrically neutralized to aggregate by hydrogen ions $H^+$ on the surface of the print medium. This mechanism can prevent color mixture between adjacent dots and prevent the pigments from permeating deeply into the print medium (and to the back surface of the print medium). To lower the pH value of the ink to a pH value corresponding to the required viscosity, it is necessary to make the pH value of the surface of the print medium lower than that of the ink corresponding to the required viscosity.

The pH value at which the ink has the required viscosity varies depending on the characteristics of the ink. In other words, some inks increase the viscosity with the pigments aggregating at a pH value relatively near the neutrality as indicated by an ink A in FIG. 2, and others require a pH value lower than that of the ink A to aggregate the pigments as indicated by an ink B having different characteristics from those of the ink A.

The behavior of the colorant in the vehicle aggregating in a dot, the dry speed, and the permeation speed into the material vary depending on the amount of droplet differing depending on the size of the dot (a small droplet, a medium droplet, and a large droplet) and on the type of the material. In the first embodiment, the amount of plasma energy in plasma processing may be adjusted to have an optimum value depending on the type of the material and a print mode (amount of droplet).

Figure 3:
FIG. 3 is an enlarged view of an image obtained by capturing an image formation surface of a printed material resulting from inkjet recording performed on a material not subjected to the plasma processing.
Figure 4:
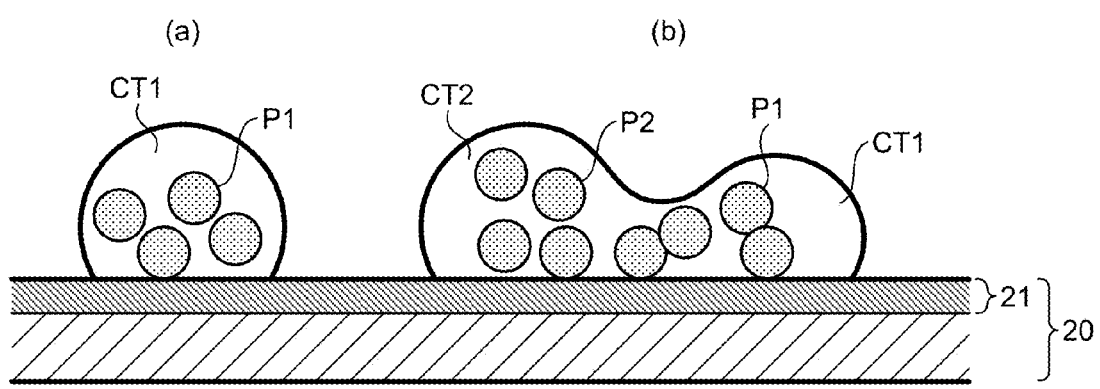
FIG. 4 is a schematic of an example of dots formed on the image formation surface of the printed material illustrated in FIG. 3.
Figure 5:
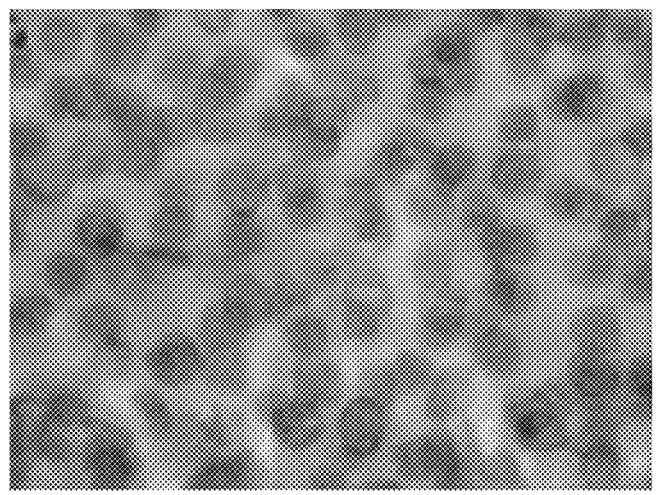
FIG. 5 is an enlarged view of an image obtained by capturing an image formation surface of a printed material resulting from inkjet recording performed on a material subjected to the plasma processing according to the first embodiment.
Figure 6:
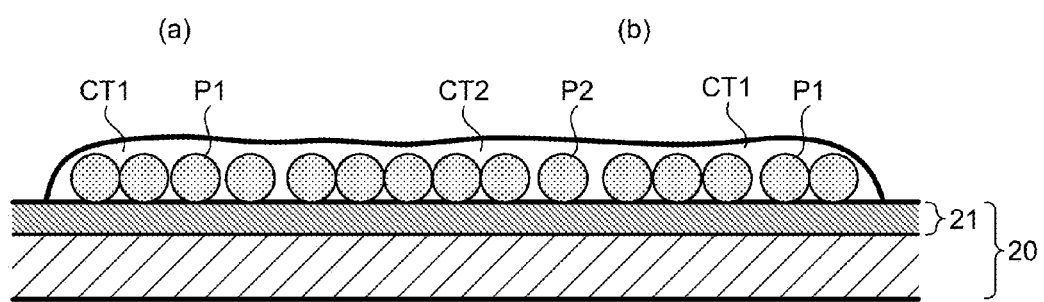
FIG. 6 is a schematic of an example of dots formed on the image formation surface of the printed material illustrated in FIG. 5.

The following describes differences in a printed material between a case where the plasma processing according to the first embodiment is performed and a case where the plasma processing is not performed with reference to FIGS. 3 to 6. FIG. 3 is an enlarged view of an image obtained by capturing an image formation surface of a printed material resulting from inkjet recording performed on a material not subjected to the plasma processing. FIG. 4 is a schematic of an example of dots formed on the image formation surface of the printed material illustrated in FIG. 3. FIG. 5 is an enlarged view of an image obtained by capturing an image formation surface of a printed material resulting from inkjet recording performed on a material subjected to the plasma processing according to the first embodiment. FIG. 6 is a schematic of an example of dots formed on the image formation surface of the printed material illustrated in FIG. 5. To obtain the printed materials illustrated in FIGS. 3 and 5, a desktop inkjet recording apparatus was used, and typical coat paper having a coat layer 21 (refer to FIG. 6) was used as the material 20.

Coat paper not subjected to the plasma processing has poor wettability of the coat layer 21 formed on the surface of the coat paper. In an image formed by performing inkjet recording on the coat paper not subjected to the plasma processing, the shape of a dot (shape of a vehicle CT1) adhering to the surface of the coat paper is distorted when the dot lands thereon as illustrated in FIGS. 3 and 4, for example. If an adjacent dot is formed in a state where the dot is not sufficiently dried yet, the vehicle CT1 and a vehicle CT2 unify when the adjacent dot lands on the coat paper as illustrated in FIGS. 3 and 4. Thus, movement (color mixture) of pigments P1 and P2 may possibly occur between the dots, resulting in density unevenness caused by beading or the like.

By contrast, coat paper subjected to the plasma processing according to the first embodiment has improved wettability of the coat layer 21 formed on the surface of the coat paper. In an image formed by performing inkjet recording on the coat paper subjected to the plasma processing, the vehicle CT1 spreads into a relatively flat perfect circle on the surface of the coat paper as illustrated in FIG. 5, for example. Thus, the dot is formed into a flat shape as illustrated in FIG. 6. Because the surface of the coat paper is acidified by polar functional groups formed by the plasma processing, the ink pigments are electrically neutralized. Thus, the pigments P1 aggregate to increase the viscosity of the ink. This mechanism suppresses movement (color mixture) of the pigments P1 and P2 between the dots even if the vehicles CT1 and CT2 unify as illustrated in FIG. 6. Furthermore, the polar functional groups generated in the coat layer 21 increase the permeability of the vehicle CT1, making it possible to dry the vehicle CT1 in a relatively short time. The dot spreading into a perfect circle because of the improved wettability permeates and aggregates, thereby causing the pigments P1 to uniformly aggregate in the height direction. This mechanism can suppress density unevenness caused by beading or the like. FIGS. 4 and 6 are schematics, and the pigments actually aggregate into layers also in the case of FIG. 6.

As described above, the material 20 is subjected to the plasma processing according to the first embodiment. With the plasma processing, the hydrophilic functional groups are formed on the surface of the material 20, thereby improving the wettability. With the plasma processing, the roughness of the surface of the material 20 increases, thereby further improving the wettability of the surface of the material 20. Furthermore, with the plasma processing, the polar functional groups are formed, thereby acidifying the surface of the material 20. Thus, the landing ink uniformly spreads on the surface of the material 20, and the negatively charged pigments are neutralized on the surface of the material 20, thereby aggregating to increase the viscosity. This mechanism can suppress movement of the pigments even if the dots eventually unify. Because the polar functional groups are also generated in the coat layer 21 formed on the surface of the material 20, the vehicle quickly permeates into the material 20, making it possible to reduce the drying time. In other words, the dot spreads into a perfect circle because of the improved wettability and permeates with the pigments prevented from moving by aggregation. Thus, the dot can maintain a shape close to a perfect circle.

Figure 7:
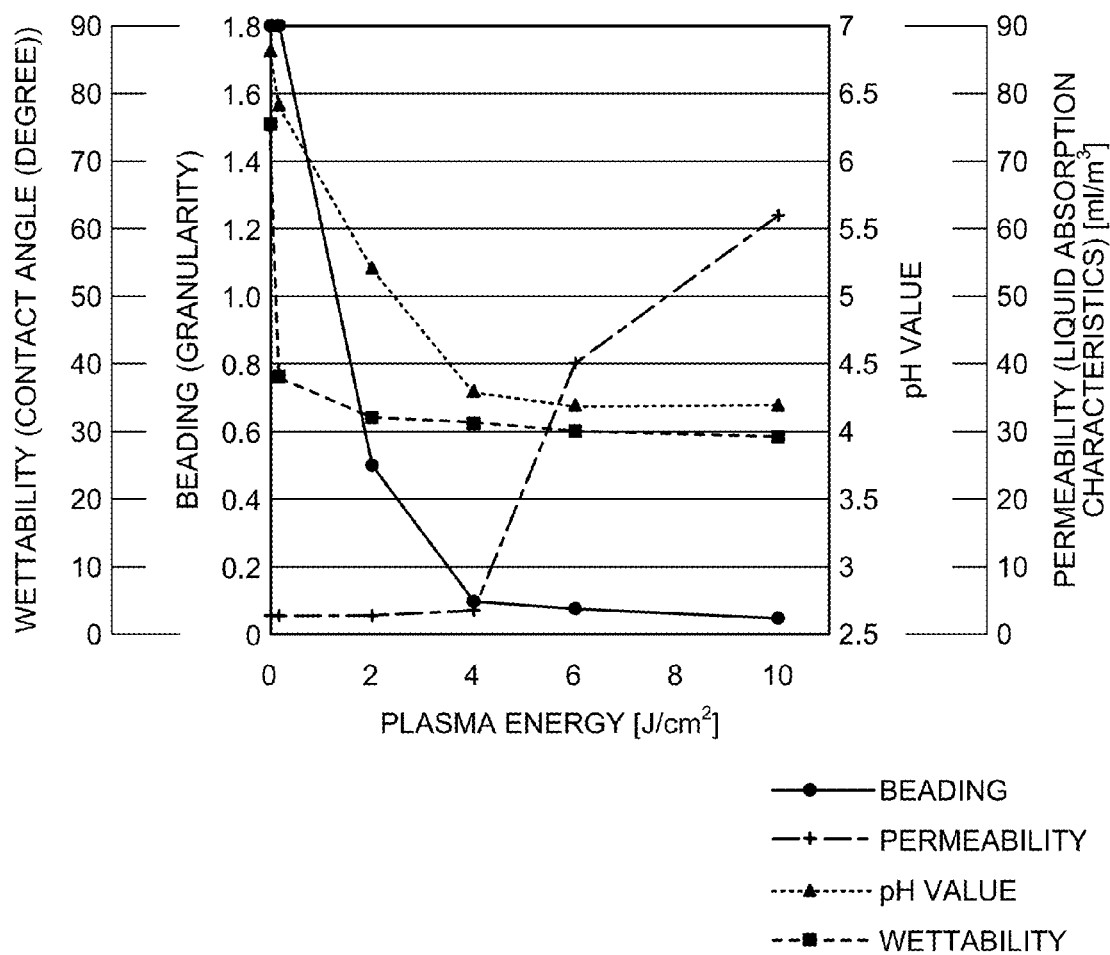
FIG. 7 is a graph of the relation between the plasma energy and the wettability, the beading, the pH value, and the permeability of the surface of the material according to the first embodiment.

FIG. 7 is a graph of the relation between the plasma energy and the wettability, the beading, the pH value, and the permeability of the surface of the material according to the first embodiment. FIG. 7 illustrates how surface characteristics (the wettability, the beading, the pH value, and the permeability (liquid absorption characteristics)) change depending on the plasma energy in a case where printing is performed on coat paper serving as the material 20. To obtain the evaluation illustrated in FIG. 7, an aqueous pigment ink (an alkaline ink in which negatively charged pigments are dispersed) was used as the ink. The aqueous pigment ink has characteristics of the pigments aggregating with acid.

As illustrated in FIG. 7, the wettability of the surface of the coat paper is drastically improved at a small value of plasma energy (e.g., approximately equal to or smaller than 0.2 $J/cm^2$), and an increase in the value of energy does not improve the wettability much. By contrast, the pH value of the surface of the coat paper decreases to a certain extent as the plasma energy increases. The pH value, however, stops decreasing when the plasma energy exceeds a certain value (e.g., approximately 4 J/cm$^2$). The permeability (liquid absorption characteristics) is drastically improved at about the point where the pH stops decreasing (e.g., approximately 4 J/cm$^2$). This phenomenon, however, varies depending on polymer components included in the ink.

In terms of the relation between the characteristics of the surface of the material 20 and the image quality, the improved wettability of the surface improves the circularity of a dot. This is because the plasma processing increases the roughness of the surface and generates the hydrophilic polar functional groups, thereby improving and uniformizing the wettability of the surface of the material 20. Another reason is that the plasma processing removes a water-repellent factor, such as dust, oil, and calcium carbonate, on the surface of the material 20. In other words, the wettability of the surface of the material 20 is improved, and unstable factors are removed from the surface of the material 20. As a result, a droplet uniformly spreads in the circumferential direction, thereby improving the circularity of the dot.

Acidification (reduction in the pH) of the surface of the material 20 causes aggregation of the ink pigments, improvement in the permeability, and permeation of the vehicle into the coat layer, for example. These phenomena increase the pigment density on the surface of the material 20, making it possible to suppress movement of the pigments even if the dots unify. This mechanism can suppress mixture of the pigments, thereby causing the pigments to uniformly precipitate and aggregate on the surface of the material. The effects of suppressing the mixture of the pigments vary depending on the components of the ink and the amount of the ink droplet. In a case where the amount of the ink droplet is small, mixture of the pigments caused by unification of the dots is less likely to occur compared with the case of a large droplet. This is because a smaller amount of vehicle can be dried and permeate more quickly and thus enables the pigments to aggregate with a smaller pH reaction. The effects of the plasma processing vary depending on the type of the material 20 and the environment (e.g., humidity). Therefore, the amount of plasma energy in the plasma processing may be adjusted to have an optimum value depending on the amount of the droplet, the type of the material 20, and the environment, for example. As a result, the reforming efficiency on the surface of the material 20 may possibly increase, thereby further achieving energy saving.

Figure 8:
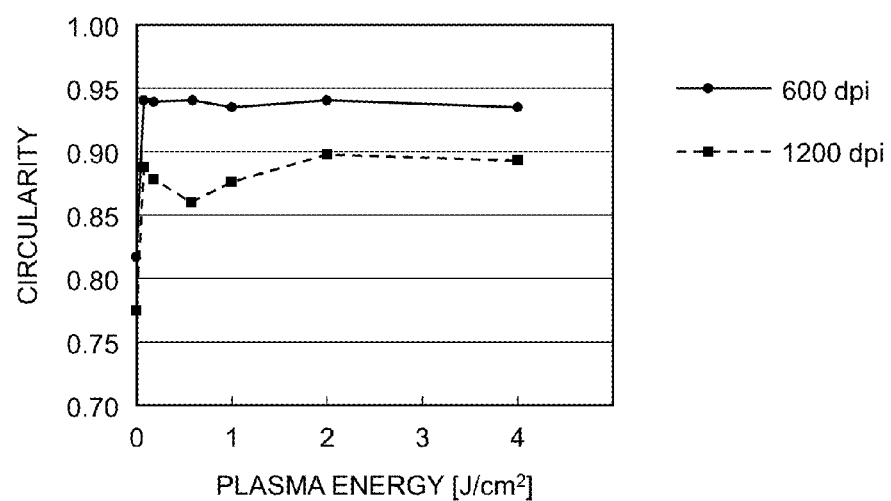
FIG. 8 is a graph of the relation between the plasma energy and the circularity of a dot according to the first embodiment.
Figure 9:
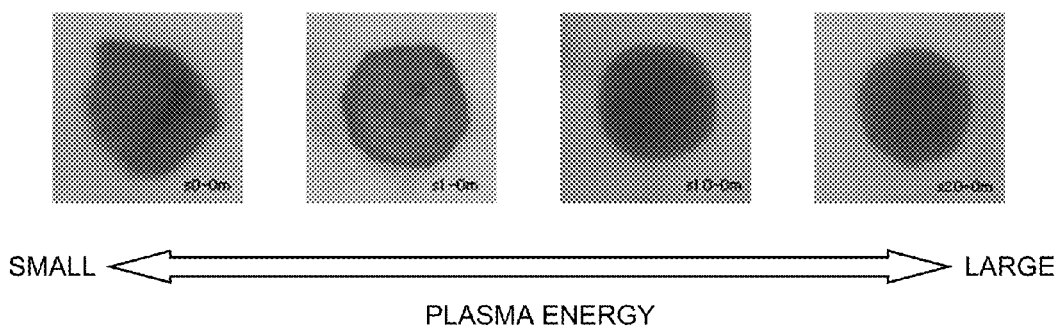
FIG. 9 is a diagram of the relation between the amount of plasma energy and the shape of an actually formed dot according to the first embodiment.

The following describes the relation between the amount of plasma energy and the circularity of a dot. FIG. 8 is a graph of the relation between the plasma energy and the circularity of a dot. FIG. 9 is a diagram of the relation between the amount of plasma energy and the shape of an actually formed dot. FIGS. 8 and 9 illustrate a case where an ink of the same color and the same type is used.

As illustrated in FIGS. 8 and 9, the circularity of a dot is significantly improved even if the plasma energy has a small value (e.g., approximately equal to or smaller than 0.2 J/cm$^2$). This is because the plasma processing performed on the material 20 increases the viscosity of the dot (vehicle) and increases the permeability of the vehicle, thereby causing the pigments to uniformly aggregate as described above.

Figure 10:
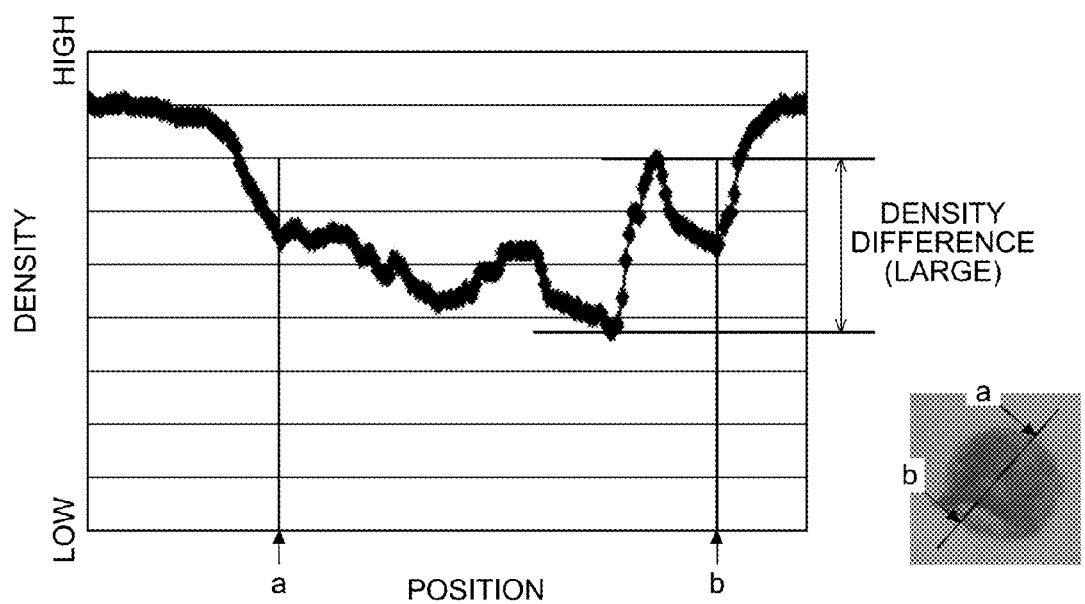
FIG. 10 is a graph of the pigment density of a dot in a case where the plasma processing according to the first embodiment is not performed.
Figure 11:
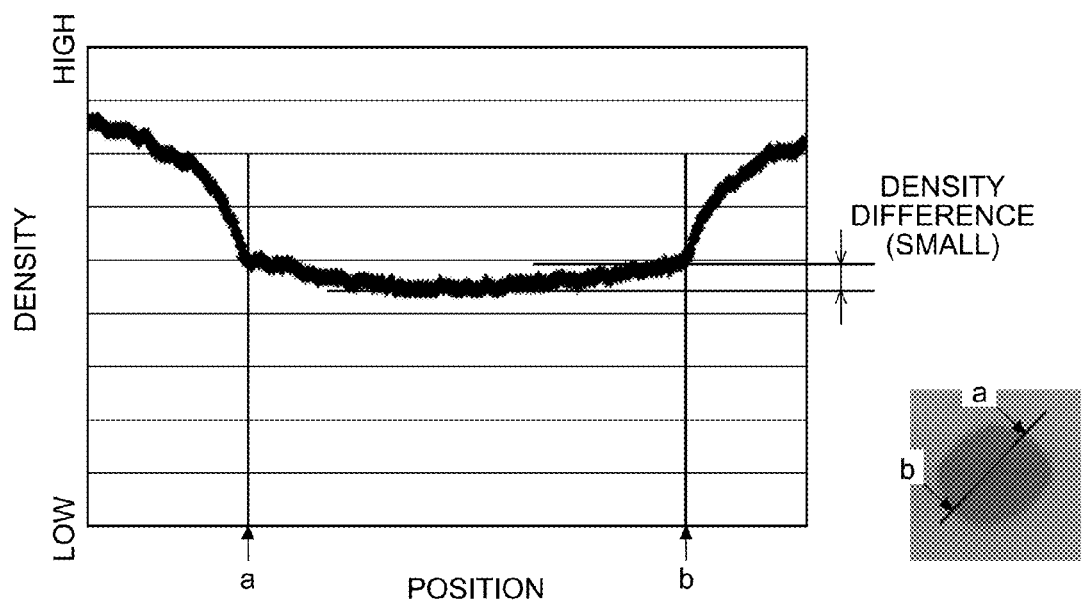
FIG. 11 is a graph of the pigment density of a dot in a case where the plasma processing according to the first embodiment is performed.

The following describes density unevenness in a dot between a case where the plasma processing is performed and a case where the plasma processing is not performed. FIG. 10 is a graph of the density of a dot in a case where the plasma processing according to the first embodiment is not performed. FIG. 11 is a graph of the density of a dot in a case where the plasma processing is performed. FIGS. 10 and 11 indicate the density on the line segment a-b in the dot image at the lower right in the respective figures.

In the measurement illustrated in FIGS. 10 and 11, an image of a formed dot was retrieved, and the density unevenness in the image was measured to calculate variations in the density. As is clear from the comparison between FIGS. 10 and 11, the variations in the density (density difference) were smaller in the case where the plasma processing was performed (FIG. 11) than in the case where the plasma processing was not performed (FIG. 10). Therefore, the amount of plasma energy in the plasma processing may be optimized so as to minimize the variations (density difference) based on the variations in the density calculated by the calculation method described above. This operation makes it possible to form a clearer image.

The method for calculating the variations in the density is not limited to the calculation method described above. The variations may be calculated by measuring the thickness of the pigments with an optical interference film thickness measuring unit. In this case, the optimum value of the amount of plasma energy may be determined so as to minimize the deviation in the thickness of the pigments.

FIGS. 8 to 11 illustrate an example of the results obtained by measuring a dot of the first color formed on the surface of the material. In terms of measurement of a dot of the second color, the same method as the measurement method for the dot of the first color may be used to obtain the results illustrated in FIGS. 8 to 11.

Figure 12:
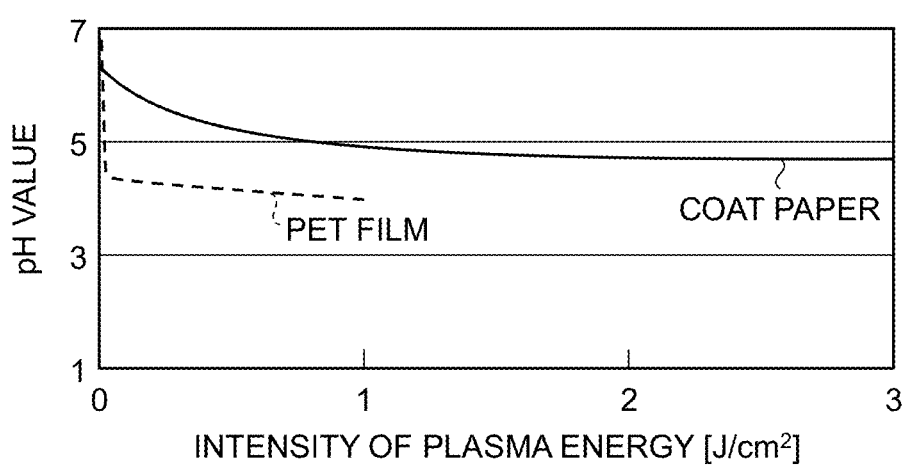
FIG. 12 is a graph of the relation between the plasma energy and the pH value according to the first embodiment.

FIG. 12 is a graph of the relation between the plasma energy and the pH value according to the first embodiment. While the pH is typically measured in a solution, recent technologies can measure the pH of the surface of a solid. Examples of measuring instruments include the pH meter B-211 manufactured by HORIBA, Ltd. and a pH tester pen.

In FIG. 12, the solid line indicates plasma energy dependency of the pH value of coat paper, whereas the dotted line indicates plasma energy dependency of the pH value of a polyethylene terephthalate (PET) film. As illustrated in FIG. 12, the PET film is acidified with a smaller plasma energy than in the case of the coat paper. The plasma energy required to acidify the coat paper was approximately equal to or smaller than 3 J/cm$^2$. In a case where an image was recorded by an inkjet processing apparatus that discharges an alkaline aqueous pigment ink on the material 20 the pH value of which is made equal to or lower than 5, a dot of the formed image had a shape close to a perfect circle. Thus, an excellent image was provided with no bleeding or no mixture of pigments caused by unification of dots.

In the first embodiment, a pH detector is provided on the downstream of the acidifying unit to read information on the pH of the surface of the material. Based on the read information on the pH, feedback control or feedforward control is performed on the plasma processing unit, Thus, control is performed such that the pH value of the surface of the material falls within a predetermined range (e.g., equal to or higher than 5.3 and equal to or lower than 6.0).

The following describes the printing apparatus, the printing system, the method for manufacturing a printed material, and the pH detecting device according to the first embodiment in greater detail with reference to the accompanying drawings. While the first embodiment describes an image forming apparatus including a discharging head (a recording head or an ink head) of four colors, which are black (K), cyan (C), magenta (M), and yellow (Y), the discharging head is not limited thereto. In other words, the image forming apparatus may further include a discharging head corresponding to green (G), red (R), and other colors or a discharging head of black (K) alone. In the description below, K, C, M, and Y correspond to black, cyan, magenta, and yellow, respectively.

While the first embodiment uses continuous paper wound in a roll (hereinafter referred to as rolled paper) as a material to be processed, the material is not limited thereto. Any recording medium on which an image can be formed, such as a cut sheet, may be used. Examples of the types of paper may include plain paper, woodfree paper, recycled paper, thin paper, thick paper, and coat paper. Examples of the material may further include an overhead projector (OHP) sheet, a synthetic resin film, a metal thin film, and a material on which an image can be formed with an ink. The rolled paper may be continuous paper (a continuous sheet or a continuous form) with cuttable perforations formed thereon at predetermined intervals. In this case, a page in the rolled paper corresponds to an area sandwiched between the perforations formed at the predetermined intervals, for example.

Figure 13:
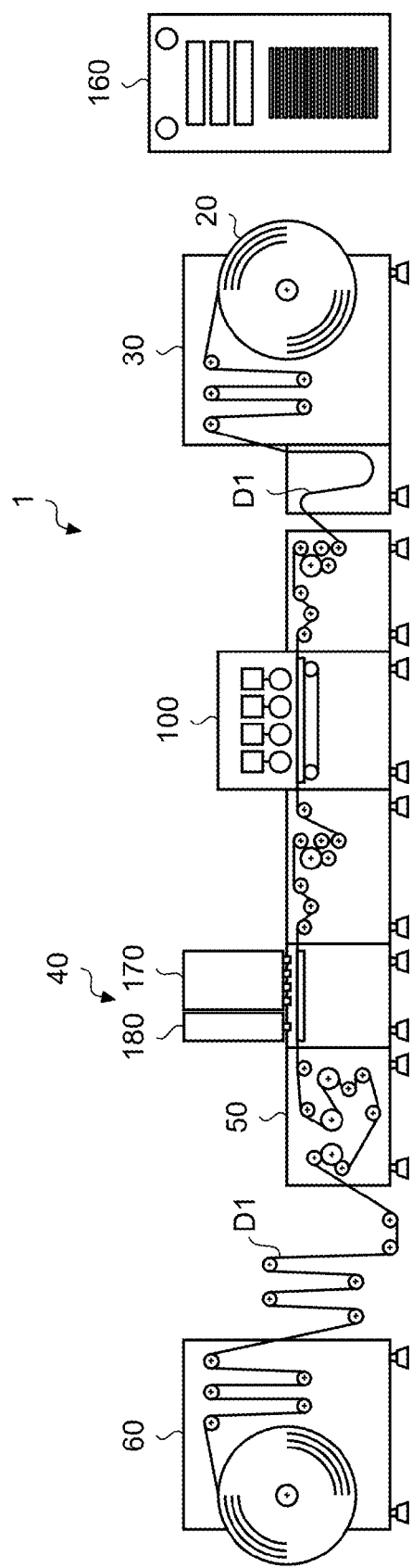
FIG. 13 is a schematic of an exemplary configuration of a printing apparatus (system) according to the first embodiment.

FIG. 13 is a schematic of an exemplary configuration of the printing apparatus (system) according to the first embodiment. As illustrated in FIG. 13, a printing apparatus (system) 1 includes a carrying-in unit 30, a plasma processing apparatus 100, and an image forming apparatus 40. The carrying-in unit 30 carries in (conveys) the material 20 (rolled paper) along a conveyance path D1. The plasma processing apparatus 100 performs plasma processing on the carried-in material 20 as preprocessing. The image forming apparatus 40 forms an image on the surface of the material 20 subjected to the plasma processing. The image forming apparatus 40 may include an inkjet head 170 and a colorimeter 180. The inkjet head 170 forms an image by performing inkjet processing on the material 20 subjected to the plasma processing. The colorimeter 180 measures a pH indicator color (color or the like) of a pH indicator supplied to the material 20. The inkjet head 170 may be a piezoelectric inkjet head or a thermal inkjet head, and various modifications may be made on the inkjet head 170. The image forming apparatus 40 may further include a post-processing unit that performs post-processing on the material 20 on which an image is formed. The printing apparatus (system) 1 may further include a drying unit 50 and a carrying-out unit 60. The drying unit 50 dries the material 20 subjected to the post-processing. The carrying-out unit 60 carries out the material 20 on which an image is formed (and subjected to the post-processing in some cases). The printing apparatus (system) 1 may further include a control unit 160 that generates raster data from image data to be printed and controls each unit in the printing apparatus (system) 1. The control unit 160 can communicate with the printing apparatus (system) 1 via a wired or wireless network. The control unit 160 is not necessarily a single computer and may be a plurality of computers connected via a network, such as a local area network (LAN). The control unit 160 may include control units individually provided to the respective units in the printing apparatus (system) 1.

Figure 14:
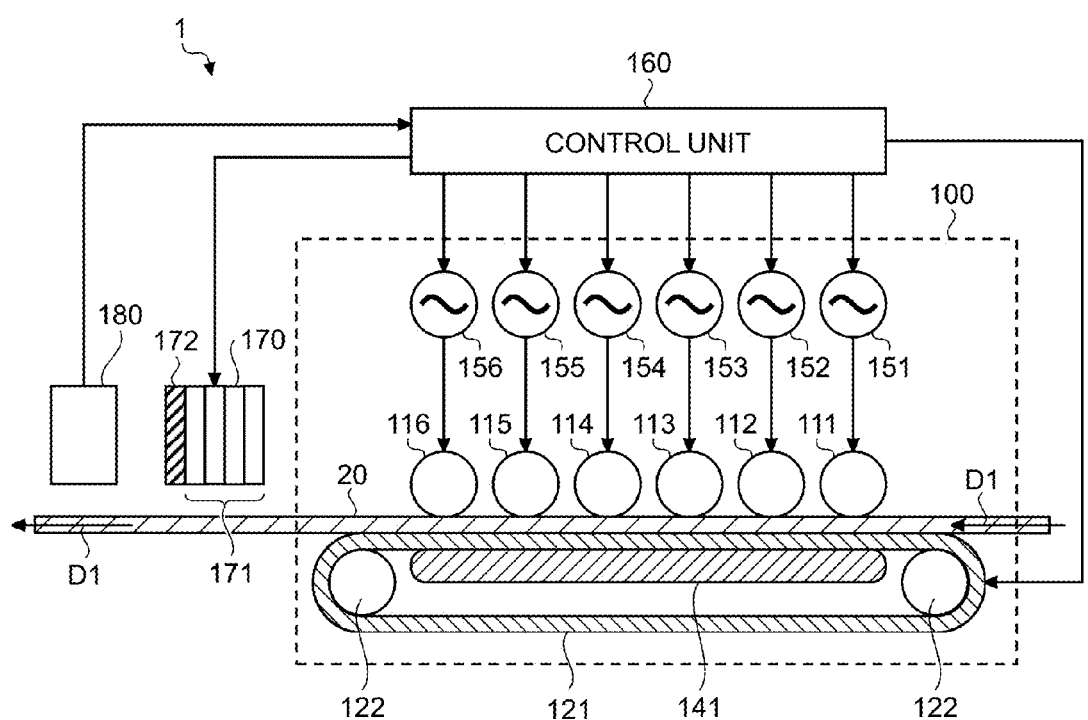
FIG. 14 is a schematic of an exemplary configuration of the plasma processing apparatus serving as an acidifying unit, an inkjet recording apparatus, and the periphery thereof in the printing apparatus (system) according to the first embodiment.

The following describes the printing apparatus (system) 1 according to the first embodiment in greater detail. FIG. 14 is a schematic of an exemplary configuration of the plasma processing apparatus serving as the acidifying unit, an inkjet recording apparatus, and the periphery thereof in the printing apparatus (system) according to the first embodiment. Because the other configuration is the same as that of the printing apparatus 1 illustrated in FIG. 13, detailed explanation thereof will be omitted.

As illustrated in FIG. 14, the printing apparatus (system) 1 uses one of a plurality of heads included in the inkjet head 170 as a head that discharges the pH indicator. Specifically, the inkjet head 170 includes ink discharging nozzles 171 and a pH indicator discharging nozzle 172. The colorimeter 180 is provided on the downstream of the inkjet head 170 and measures a pH indicator color of the pH indicator adhering to the material 20.

The plasma processing apparatus 100 includes a plurality of discharge electrodes 111 to 116, high-frequency high-voltage power sources 151 to 156, a counter electrode 141, a dielectric 121, and rollers 122. The discharge electrodes 111 to 116 are aligned along the conveyance path D1. The high-frequency high-voltage power sources 151 to 156 supply a high-frequency and high-voltage pulse voltage to the discharge electrodes 111 to 116, respectively. The counter electrode 141 is shared by the discharge electrodes 111 to 116. The dielectric 121 is a belt-conveyer-type endless dielectric arranged so as to move between the discharge electrodes 111 to 116 and the counter electrode 141 along the conveyance path D1. In the case of using the discharge electrodes 111 to 116 aligned along the conveyance path D1, an endless belt is suitably used for the dielectric 121 as illustrated in FIG. 14. Alternatively, a dielectric roller obtained by coating a metal roller with a dielectric may be used.

The control unit 160 drives the rollers 122 based on an instruction received from a host device, which is not illustrated, thereby rotating the dielectric 121. The material 20 is carried onto the dielectric 121 from the carrying-in unit 30 (refer to FIG. 13) arranged on the upstream and is caused to pass through the conveyance path D1 by rotation of the dielectric 121. The high-frequency high-voltage power sources 151 to 156 supply a high-frequency and high-voltage pulse voltage to the discharge electrodes 111 to 116, respectively, based on an instruction received from the control unit 160. The pulse voltage may be supplied to all the discharge electrodes 111 to 116 or to a part of the discharge electrodes 111 to 116 required to make the pH value of the surface of the material 20 equal to or lower than a predetermined pH value. Alternatively, the control unit 160 may adjust the frequency and the voltage value (corresponding to the plasma energy) of the pulse voltage supplied from the high-frequency high-voltage power sources 151 to 156 to the amount of plasma energy required to make the pH value of the surface of the material 20 equal to or lower than the predetermined pH value.

One of the methods for providing the amount of plasma energy required to acidify the surface of the material 20 is to increase the time of the plasma processing. This method can be achieved by reducing the conveyance speed of the material 20, for example. To record an image on the material 20 at high speed, however, it is necessary to reduce the time of the plasma processing. The time of the plasma processing using the discharge electrodes 111 to 116 as described above may be reduced by: driving a required number of discharge electrodes out of the discharge electrodes 111 to 116 based on the printing speed and the required pH value; and adjusting the intensity of the plasma energy supplied to the discharge electrodes 111 to 116, for example. Alternatively, by providing a humidity adjusting mechanism to the plasma processing apparatus 100, it is possible to control the acidification (refer to Japanese Patent Application Laid-open No. 2013-199017). Various modifications may be made on the method as appropriate, such as a method obtained by combining the methods described above and other methods.

It is effective that the plasma processing apparatus 100 is provided with the plurality of discharge electrodes 111 to 116 in terms of uniform acidification of the surface of the material 20. At the same conveyance speed (or printing speed), for example, a time required for the material 20 to pass through a plasma space can be made longer in acidification performed by a plurality of discharge electrodes than in acidification performed by one discharge electrode. As a result, it is possible to perform acidification on the surface of the material 20 more uniformly.

The ink discharging nozzles 171 in the inkjet head 170 may include a plurality of heads of the same color (e.g., four heads of four colors). This configuration can increase the speed of the inkjet recording. To achieve resolution of 1200 dpi at high speed, for example, the heads of each color in the inkjet head 170 may be fixed in a displaced manner so as to correct gaps between the nozzles that discharge the ink. The heads of each color may receive drive pulses at various drive frequencies such that a dot of the ink discharged from each nozzle corresponds to three types of volumes called a large droplet, a medium droplet, and a small droplet.

The pH indicator discharging nozzle 172 in the inkjet head 170 discharges the pH indicator that exhibits a pH indicator color based on a pH value. This configuration can supply the pH indicator to a blank surface of the material 20. In the first embodiment, the target range for the pH value of the surface of the material 20 is equal to or higher than 5.3 and equal to or lower than 6.0 (more preferably 5.8). Therefore, a bromocresol purple (BCP) solution, which has the sensitivity in a range from pH 6.8 (purple) to pH 5.2 (yellow) (hereinafter referred to as a pH indicator range), is preferably used as the pH indicator. Because the optimum pH value varies depending on the type of the ink, the pH indicator is not limited to the BCP solution, and a pH indicator having another pH indicator range may be used.

The pH indicator discharging nozzle 172 serving as a pH indicator supplying unit may be provided separately from the inkjet head 170, that is, from the ink discharging nozzles 171. In this case, the pH indicator discharging nozzle 172 may be controlled by a control unit (not illustrated) provided separately for the pH indicator or by the control unit 160 similarly to the ink discharging nozzles 171. In a case where the pH indicator is deteriorated by heat, the inkjet head 170 that discharges the pH indicator is preferably a piezoelectric inkjet head. In a case where the pH indicator is not deteriorated by heat, the inkjet head 170 may be a thermal inkjet head. As described above, various modifications may be made on the pH indicator supplying unit depending on the property of the pH indicator.

In a case where the pH indicator is a solution, and the pH indicator supplying unit is arranged on the upstream of the plasma processing apparatus 100, a large current may possibly flow in the material 20 because of the water permittivity. To address this, the pH indicator discharging nozzle 172 is preferably arranged on the downstream of the plasma processing apparatus 100.

The colorimeter 180 is arranged on the downstream of the inkjet head 170 and measures the pH indicator color of the pH indicator supplied to the surface of the material 20 in a non-contact manner. A color value resulting from measurement made by the colorimeter 180 is input to the control unit 160.

Based on the pH indicator color (e.g., a color value) measured by the colorimeter 180, the control unit 160 controls the plasma energy supplied to the material 20 such that the pH value of the surface of the material 20 falls within a target range (e.g., equal to or higher than 5.3 and equal to or lower than 6.0). The control unit 160 controls the amount of plasma energy by: adjusting the number of driven discharge electrodes 111 to 116 and/or the plasma energy of the pulse voltage supplied from the high-frequency high-voltage power sources 151 to 156 to the discharge electrodes 111 to 116, respectively; or adjusting the speed at which the material 20 passes through the plasma processing apparatus 100.

Figure 15:
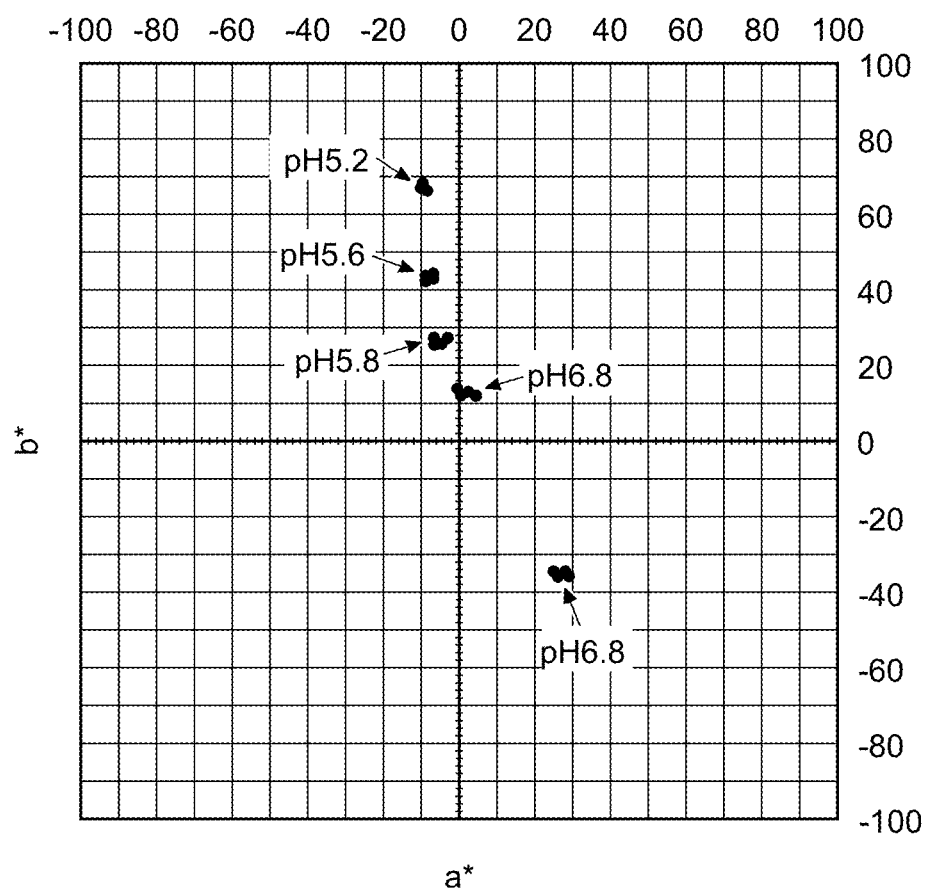
FIG. 15 is a graph indicating an example of measurement results obtained by a colorimeter in a case where a bromocresol purple (BCP) solution is used as a pH indicator on an $a^*b^*$ plane according to the first embodiment.
Figure 16:
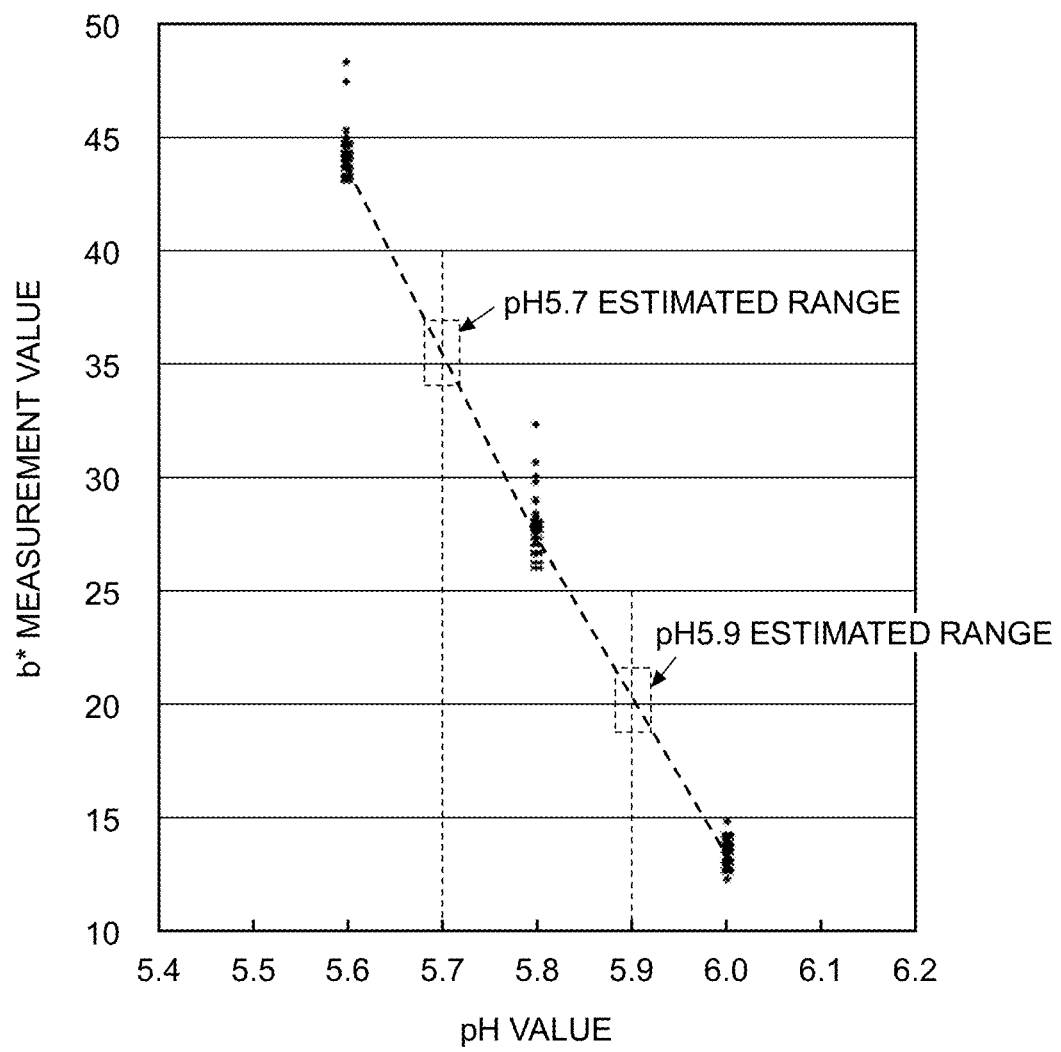
FIG. 16 is a graph of the relation between the $b^*$ measurement value and the pH value based on the measurement results obtained by the colorimeter illustrated in FIG. 15.

In a case where the BCP solution is used as the pH indicator as described above, a change in the pH indicator color from purple to yellow exhibits a distribution extending in a vertical-axis b* direction on an a*b* plane in the CIE 1976 (L*, a*, b*) color space, for example. FIG. 15 is a graph indicating an example of measurement results obtained by the colorimeter in a case where the BCP solution is used as the pH indicator on the a*b* plane according to the first embodiment. FIG. 16 is a graph of the relation between the b* measurement value and the pH value based on the measurement results obtained by the colorimeter illustrated in FIG. 15. As illustrated in FIGS. 15 and 16, analyzing b* in the pH indicator color measured by the colorimeter 180 makes it possible to specify the pH value of the surface of the material 20.

The units (apparatuses) illustrated in FIG. 13 or FIG. 14 may be provided in respective different housings and collectively configured as the printing system 1 or may be accommodated in a single housing and configured as the printing apparatus 1. In a case where the units (apparatuses) are configured as the printing system 1, the pH detecting device including the pH indicator discharging nozzle 172 and the colorimeter 180 may be provided in the printing system 1. In a case where the units (apparatuses) are configured as the printing system 1, the control unit 160 may be included in any one of the units or the apparatuses.

Figure 17:
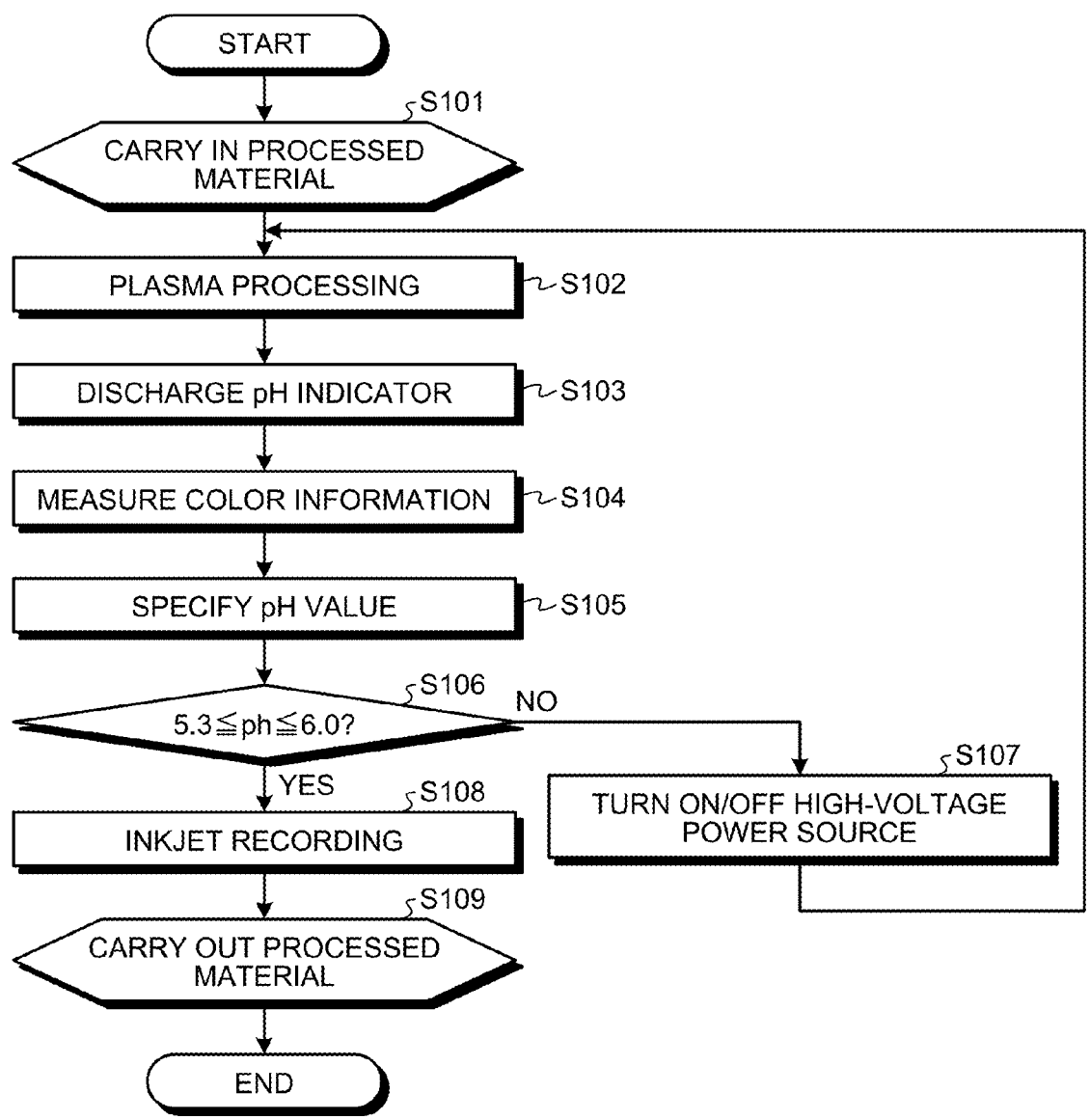
FIG. 17 is a flowchart of an example of printing including acidification according to the first embodiment.

The following describes printing including the plasma processing according to the first embodiment in detail with reference to the accompanying drawings. FIG. 17 is a flowchart of an example of printing including acidification according to the first embodiment. FIG. 17 illustrates a case where printing is performed by the printing apparatus 1 illustrated in FIG. 14 using a cut sheet (a recording medium cut in a predetermined size) as the material 20. The material 20 is not limited to a cut sheet, and the printing described below can also be performed on rolled paper wound in a roll.

In the printing illustrated in FIG. 17, the control unit 160 drives the rollers 122 to rotate the dielectric 121, thereby carrying the material 20 conveyed from the upstream on the dielectric 121 into the plasma processing apparatus 100 (Step S101). The control unit 160 then drives the high-frequency high-voltage power sources 151 to 156 to supply the pulse voltage to the discharge electrodes 111 to 116, respectively, thereby performing the plasma processing (Step S102). In the plasma processing, if no detection result has been input to the control unit 160 from the colorimeter 180, the control unit 160 supplies the plasma energy at predetermined intensity to the discharge electrodes 111 to 116. By contrast, if a detection result has been input to the control unit 160 from the colorimeter 180, the control unit 160 controls the number of high-frequency high-voltage power sources 151 to 156 to be driven and the plasma energy to be supplied to the discharge electrodes 111 to 116 based on the detected pH value. At this time, the control unit 160 may control the rotating speed of the rollers 122, thereby adjusting the conveyance speed of the material 20.

Then, the pH indicator discharging nozzle 172 of the inkjet head 170 discharges and supplies the pH indicator to an area on the material 20 subjected to the plasma processing (Step S103). The control unit 160 acquires color information of the pH indicator (e.g., the pH indicator color) from the colorimeter 180 (Step S104). The control unit 160 analyzes the color information, thereby specifying the pH value of the surface of the material 20 subjected to the plasma processing (Step S105).

Then, the control unit 160 determines whether the specified pH value falls within a predetermined range (e.g., equal to or higher than 5.3 and equal to or lower than 6.0) (Step S106). If the pH value does not fall within the predetermined range (No at Step S106), the control unit 160 changes the number of driven high-frequency high-voltage power sources 151 to 156 (Step S107) and then performs the processing at Step S102 again. If the pH value exceeds the predetermined range, for example, the control unit 160 turns on the turned-off high-frequency high-voltage power sources 151 to 156 and increases the plasma energy supplied to the discharge electrodes 111 to 116. Alternatively, the control unit 160 controls the rotating speed of the rollers 122 so as to reduce the conveyance speed of the material 20. If the pH value falls below the predetermined range, the control unit 160 turns off the driven high-frequency high-voltage power sources 151 to 156 and decreases the plasma energy supplied to the discharge electrodes 111 to 116. Alternatively, the control unit 160 controls the rotating speed of the rollers 122 so as to increase the conveyance speed of the material 20. This operation increases or decreases the amount of plasma energy supplied to the material 20. Thus, the pH value of the surface of the material 20 subjected to the processing is adjusted to fall within the predetermined range.

If the pH value falls within the predetermined range (Yes at Step S106), the control unit 160 drives the ink discharging nozzles 171 of the inkjet head 170, thereby performing inkjet recording on the material 20 subjected to the plasma processing (Step S108). Subsequently, the control unit 160 carries out the material 20 to the downstream of the inkjet head 170 (Step S109) and then terminates the processing.

If the pH value exceeds the predetermined range at Step S106, the material 20 may be conveyed to a bypass, which is not illustrated, and be subjected to the plasma processing (Step S102) again. This operation can avoid production of an unnecessary material 20. If a recording medium having a different type of property is included in the material 20, the recording medium can be processed in the same manner.

In a case where rolled paper is used as the material 20, the pH value after the plasma processing may be measured using a leading end of the paper guided by a paper feeding device, which is not illustrated, at Step S103 to Step S106. In the case of using rolled paper, the property of the paper hardly changes in the single roll. Therefore, after the adjustment of the amount of plasma energy using the leading end, continuous printing can be stably performed without changing the settings. In a case where the printing apparatus 1 stops for a long time without using up the entire rolled paper, however, the property of the paper may possibly change. To address this, the pH value after the plasma processing may be measured using the leading end in the same manner described above before the restart of printing.

The processing of supplying the pH indicator and adjusting the amount of plasma energy at Step S103 to Step S107 may be performed regularly or continuously. At this time, the pH value after the plasma processing may be measured using a margin of the rolled paper. Thus, the printing apparatus 1 can perform control more precisely and stably.

As described above, according to the first embodiment, a high-quality printed material can be provided by adjusting the amount of plasma energy of the plasma processing unit. Even if the property of the material 20 or the printing speed is changed, the acidification can be stably performed. Thus, excellent image recording can be stably achieved.

While the BCP solution is used as the pH indicator in the embodiment above, it is not limited thereto. In other words, any pH indicator suitable for a required pH indicator value may be used. Instead of the BCP solution, a litmus solution or a bromthymol blue (BTB) solution may be used as the pH indicator, for example.

In the CIE 1976 (L*, a*, b*) color space, a* or L* may be analyzed depending on the type of the used pH indicator, for example. The color system is not limited to the "1976 CIE L*a*b* space", and the RGB system, the XYZ system, or the Luv system may be used, for example. In a case where the required pH value falls within a variation range of litmus, litmus may be used as the pH indicator, and a value of the X-axis in the XYZ color space may be detected. The unit that acquires the color information from the pH indicator is not limited to the colorimeter 180. In other words, various modifications may be made on the colorimeter 180 as long as it can acquire any kind of color information for specifying the pH value.

Second Embodiment

A printing apparatus, a printing system, a method for manufacturing a printed material, and a pH detecting device according to a second embodiment of the present invention will be described in detail with reference to the accompanying drawings. In the description below, overlapping explanation will be omitted for the same components as those of the embodiment above.

Figure 18:
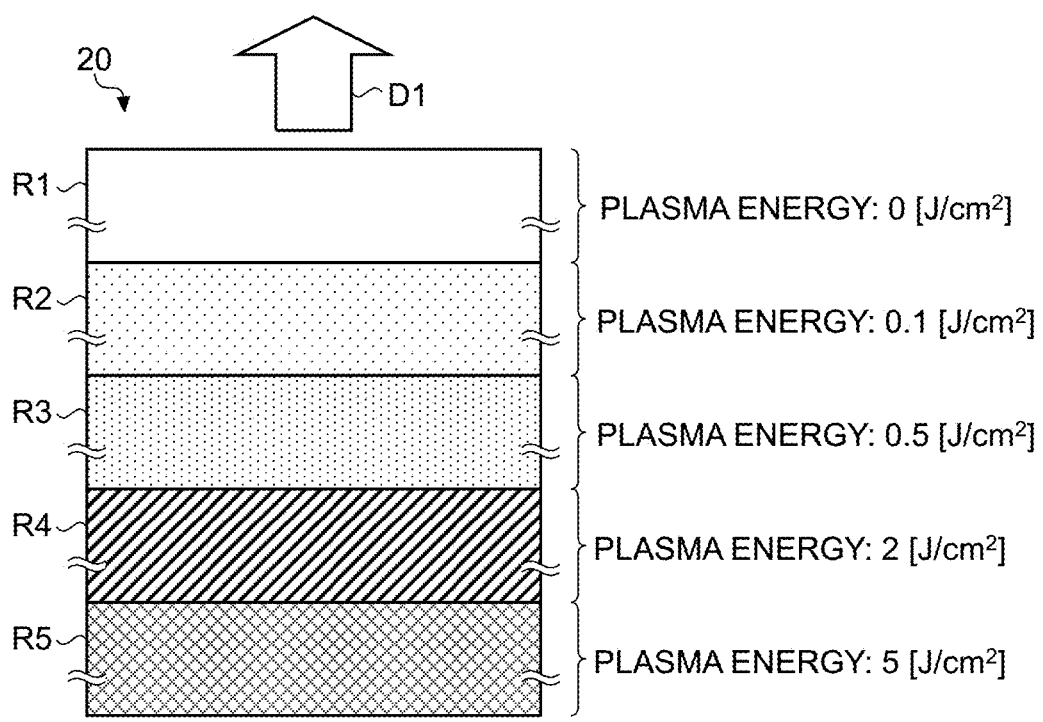
FIG. 18 is a diagram of an example of a pattern in which the amount of plasma energy in acidification is changed in stepwise fashion according to a second embodiment.

FIG. 18 is a diagram of an example of a pattern in which the amount of plasma energy in acidification is changed in stepwise fashion according to the second embodiment. In the second embodiment, plasma processing is performed while changing in stepwise fashion the amount of plasma energy of the plasma processing unit that acidifies the surface of the material 20. Thus, a plurality of areas processed with different amounts of plasma energy as illustrated in FIG. 18 is formed. In the second embodiment, at least one of the areas illustrated in FIG. 18 is analyzed, thereby specifying the amount of plasma energy that achieves the optimum pH value for the material 20. Thus, in the second embodiment, a more appropriate amount of plasma energy can be specified.

The configuration of the printing apparatus (system) according to the second embodiment may be the same as that of the first embodiment. In the second embodiment, the configuration is used, thereby controlling the amount of plasma energy of the plasma processing apparatus 100 in stepwise fashion. Thus, a plurality of areas processed with different amounts of plasma energy as illustrated in FIG. 18 is formed. Subsequently, the inkjet head 170 arranged on the downstream of the plasma processing apparatus 100 discharges the pH indicator to the surface of the material 20. The colorimeter 180 arranged on the downstream of the inkjet head 170 acquires color information of the pH indicator. Based on the color information, the printing apparatus (system) specifies the optimum conditions of the amount of plasma energy to adjust the conditions of the plasma processing (e.g., the number of driven electrodes, the pulse voltage, and the conveyance speed).

Figure 19:
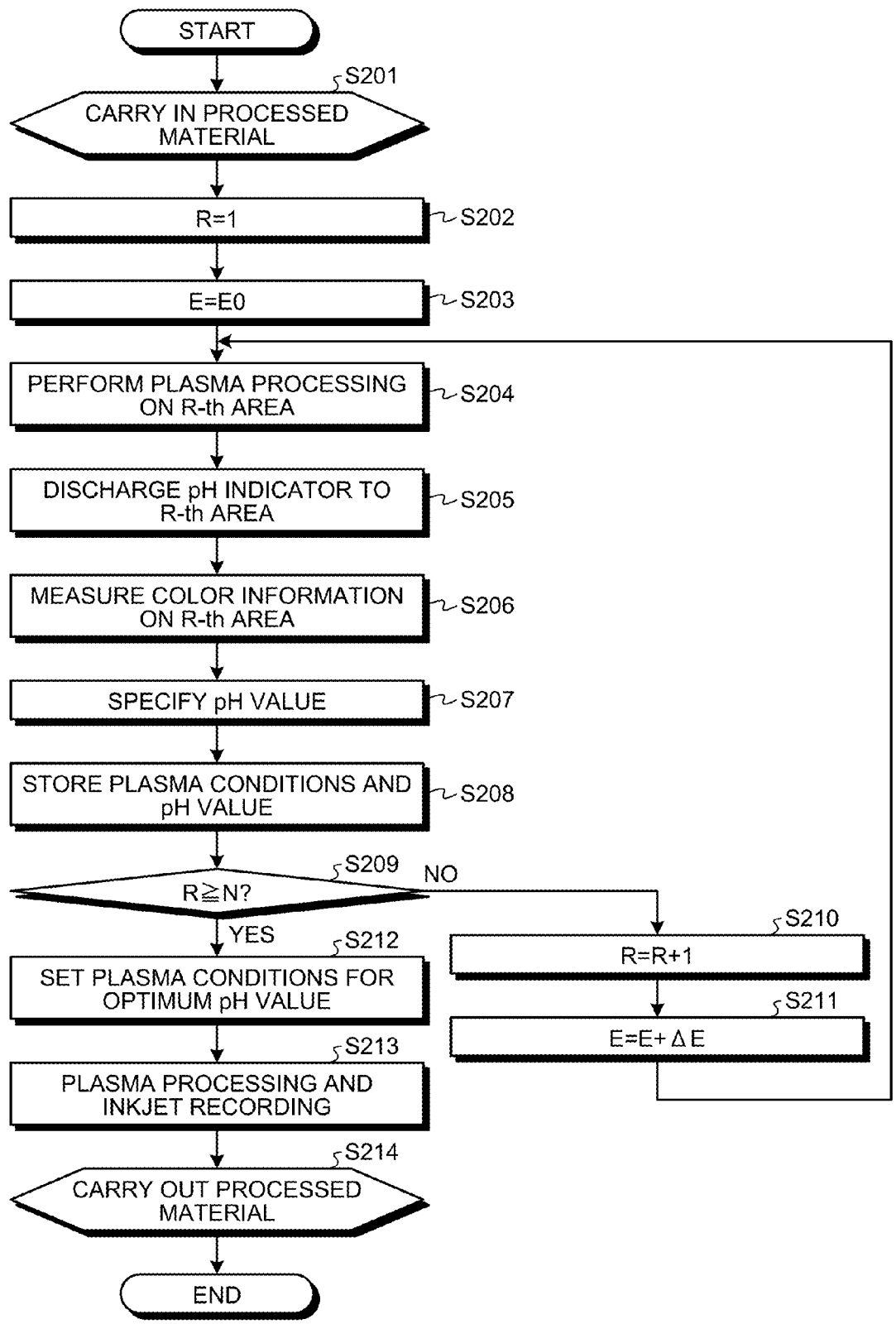
FIG. 19 is a flowchart of an example of printing including acidification according to the second embodiment.

FIG. 19 is a flowchart of an example of printing including acidification according to the second embodiment. Similarly to FIG. 17, FIG. 19 also illustrates a case where printing is performed by the printing apparatus 1 illustrated in FIG. 14 using a cut sheet (a recording medium cut in a predetermined size) as the material 20. The material 20 is not limited to a cut sheet, and the printing described below can also be performed on rolled paper wound in a roll.

In the printing illustrated in FIG. 19, the control unit 160 drives the rollers 122 to rotate the dielectric 121, thereby carrying the material 20 conveyed from the upstream on the dielectric 121 into the plasma processing apparatus 100 (Step S201). The control unit 160 assigns "1" indicating the leading end to a value R corresponding to the high-frequency high-voltage power sources 151 to 156 in order from the upstream (Step S202). The control unit 160 then sets a plasma energy E of the plasma processing apparatus 100 to an initial value E0 (Step S203). The initial value E0 of the plasma energy may be 0 J/cm$^2$.

The control unit 160 performs plasma processing on the R-th area in the material 20 with the set plasma energy E (=E0) (Step S204). As a result, the area R1 illustrated in FIG. 18 is formed.

Then, the control unit 160 causes the pH indicator discharging nozzle 172 of the inkjet head 170 to discharge the pH indicator to the R-th area (Step S205). The control unit 160 then measures the pH indicator color of the R-th area with the colorimeter 180 (Step S206).

Then, the control unit 160 specifies the pH value of the R-th area based on the measured pH indicator color (Step S207). The control unit 160 then stores the specified pH value and the plasma conditions (e.g., the plasma energy, the conveyance speed, and the type of paper) for the R-th area in a memory or the like, which is not illustrated (Step S208).

Then, the control unit 160 determines whether R reaches a predetermined upper limit n (Step S209). If R does not reach the upper limit n (No at Step S209), the control unit 160 increments R by 1 (Step S210) and sets the plasma energy E to a value obtained by adding a predetermined energy range $\Delta E$ to the plasma energy E (E+$\Delta E$) (Step S211). The control unit 160 then performs the processing at Step S204 again and repeats the processing subsequent thereto. Thus, the pH values of the area R2 and the areas subsequent thereto illustrated in FIG. 18 are measured, and the values are stored in the memory or the like, which is not illustrated, in a manner associated with the plasma conditions.

By contrast, if R reaches the upper limit n (Yes at Step S209), the control unit 160 specifies the optimum plasma conditions based on the pH values stored in the memory or the like, which is not illustrated, as the plasma conditions (Step S212). After this, the control unit 160 performs plasma processing under the plasma conditions and inkjet recording on the material 20 (Step S213). Subsequently, the control unit 160 carries out the material 20 to the downstream of the inkjet head 170 (Step S214) and then terminates the processing.

In the second embodiment, while the pH values of the areas processed with the amount of plasma energy changed in stepwise fashion up to the predetermined upper limit n are specified, it is not limited thereto. For example, the plasma conditions at the time when the specified pH value falls within a predetermined pH range (e.g., equal to or higher than 5.3 and equal to or lower than 6.0) may be used as the optimum plasma conditions, thereby performing the processing at Step S213, for example. Alternatively, the pH value of the area processed with at least an amount of plasma energy may be specified and the optimum plasma conditions (e.g., the amount of plasma energy) are estimated from the result of specification, thereby performing the processing at Step S213 based on the result of estimation.

As described above, according to the second embodiment, a high-quality printed material can be provided by accurately adjusting the amount of plasma energy in the acidifying unit similarly to the first embodiment. Even if the property of the material or the printing speed is changed, the acidification is stably performed. Thus, excellent image recording is stably achieved.

While the embodiment above applies the pH indicator to the material 20 after performing the plasma processing, the embodiment is not limited thereto. The embodiment may perform the plasma processing after applying the pH indicator to the material 20 and sufficiently drying it. In a case where a device that dries the pH indicator adhering to the material 20 is provided on the conveyance path, the plasma processing apparatus may be arranged on the downstream of the drying device.

While the embodiment above sets the target range of the pH value in the case of using the BCP solution as the pH indicator to 5.3 to 6.0, it is not limited thereto. In a case where the target pH value is considered in terms of the dot diameter, the circularity, and suppression of beading, for example, the embodiment may set the target pH value to 5.8 and perform control such that the pH value approaches the target value as much as possible.

While the embodiment above uses the head (nozzles) in the inkjet head 170 as the supplying unit that supplies the pH indicator to the material 20, it is not limited thereto. The embodiment may use a device that applies a solvent, such as a pre-applied agent, to the material 20. Examples of the supplying unit may include a roller, a brush, a sponge (more preferably a melamine sponge), a urethane blade, a bar coater (including a wire bar coater), a magic pen, and other various units.

Because the inkjet head can apply the pH indicator to the material 20 in an adhering state closer to that of the adhering ink, the inkjet head is preferably used as the pH indicator supplying unit. In other words, the inkjet head is effectively used to detect (or estimate) the adhering state of the ink. By setting the resolution of the pH indicator to relatively high resolution of 600 to 1200 dpi, it is possible to entirely cover the surface of the material 20 with the pH indicator. This setting makes it possible to detect the pH value of the surface of the material 20 more accurately.

While the embodiment above uses the colorimeter 180 as the unit that acquires (detects) the color information from the pH indicator, it is not limited thereto. Various modifications may be made on the colorimeter 180 as long as it can acquire (detect) the color information from the pH indicator like a charge-coupled device (CCD) and other capturing units, for example.

The present invention can provide a printing apparatus, a printing system, a method for manufacturing a printed material, and a pH detecting device that can manufacture a high-quality printed material.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pH detecting device comprising:
   a supplying unit to supply a pH indicator, with an inkjet head, to a surface of a material to be processed on which acidification is performed;
   a color information detector to detect color information of the pH indicator supplied to the surface of the material; and
   a pH specifying unit to specify a pH value of the surface of the material based on the color information.

2. The printing apparatus according to claim 1, wherein the supplying unit is a piezoelectric inkjet head.

3. The printing apparatus according to claim 1, wherein the color information detector is a colorimeter.

4. The printing apparatus according to claim 1, wherein the color information detector detects a value in a coordinate system of a color space corresponding to a type of the pH indicator.

5. The printing apparatus according to claim 1, wherein, when the pH indicator is bromocresol purple, the color information detector detects at least a value of a b*-axis in an L*a*b* color space.

6. The printing apparatus according to claim 1, wherein, when the pH indicator is litmus, the color information detector detects at least a value of an X-axis in an XYZ color space.

7. The printing apparatus according to claim 1, wherein the acidifying unit is a plasma processing unit that performs plasma processing on at least the surface of the material.

8. The printing apparatus according to claim 7, further comprising a control unit to control the plasma processing unit to form a plurality of areas processed with different amounts of plasma energy on the surface of the material,
control the supplying unit to supply the pH indicator to each of the areas,
control the color information detector to detect the color information from the pH indicator supplied to each of the areas,
control the pH specifying unit to specify the pH value of each of the areas resulting from detection, and
set the amount of plasma energy of the plasma processing unit based on the specified pH value of each of the areas.

9. A printing apparatus comprising:
the pH detecting device according to claim 1; and
a recording unit to perform inkjet recording on the surface subjected to the acidification.

10. The printing apparatus according to claim 9, wherein the supplying unit is a part of an inkjet head included in the recording unit.

11. The printing apparatus according to claim 9, wherein the recording unit discharges an ink having negatively charged pigments dispersed in a liquid.

12. The printing apparatus according to claim 9, wherein the recording unit discharges an aqueous pigment ink.

13. A printing system comprising:
an acidifying device to perform acidification on a material to be processed;
a supplying device to supply a pH indicator to a surface of the material on which the acidification is performed by the acidifying device;
a recording device to perform inkjet recording on the surface of the material subjected to the acidification;
a color information detector to detect color information of the pH indicator supplied to the surface of the material; and
a pH specifying unit to specify a pH value of the surface of the material based on the color information.

14. A method for manufacturing a printed material by forming, with an inkjet recording system, an image on a material to be processed, the method comprising:
acidifying a surface of the material;
supplying a pH indicator to the acidified surface of the material;
detecting color information of the pH indicator supplied to the surface of the material;
specifying a pH value of the surface of the material based on the detected color information of the pH indicator;
determining energy to be used to acidify the surface of the material based on the specified pH value;
acidifying the surface of the material using the determined energy; and
forming the image with the inkjet recording system on the material acidified using the determined energy.

* * * * *